(12) United States Patent
Ozaki et al.

(10) Patent No.: US 7,252,191 B2
(45) Date of Patent: Aug. 7, 2007

(54) MULTIFUNCTIONAL CONVEYANCE TYPE CONVEYOR CHAIN

(75) Inventors: Hajime Ozaki, Osaka (JP); Katsutoshi Shibayama, Osaka (JP); Yoshihiro Murakami, Osaka (JP)

(73) Assignee: Tsubakimoto Chain Company, Osaka (JP)

( * ) Notice: Subject to any disclaimer, the term of this patent is extended or adjusted under 35 U.S.C. 154(b) by 0 days.

(21) Appl. No.: 11/287,690

(22) Filed: Nov. 28, 2005

(65) Prior Publication Data

US 2006/0151304 A1    Jul. 13, 2006

(30) Foreign Application Priority Data

Dec. 24, 2004  (JP)  ............................. 2004-374030

(51) Int. Cl.
  *B65G 17/24*  (2006.01)
(52) U.S. Cl. ...................................... 198/779; 198/853
(58) Field of Classification Search ................ 198/779, 198/850–853; 193/35 MD
  See application file for complete search history.

(56) References Cited

U.S. PATENT DOCUMENTS 4,832,183 A    5/1989  Lapeyre 6,318,544 B1 * 11/2001 O'Connor et al. .......... 198/853
6,997,306 B2 *  2/2006 Sofranec et al. ............ 198/779
7,021,454 B2 *  4/2006 Ozaki et al. ................ 198/779
7,137,504 B2 * 11/2006 Ozaki et al. ................ 198/779

FOREIGN PATENT DOCUMENTS

| EP | 1591383 A2 | 11/2005 |
|---|---|---|
| JP | 2003-182829 | 7/2003 |
| WO | WO 2004/078619 | 9/2004 |

OTHER PUBLICATIONS

European Search Report, Apr. 7, 2006, Tsubakimoto.

* cited by examiner

*Primary Examiner*—James R Bidwell
(74) *Attorney, Agent, or Firm*—Woodling, Krost and Rust

(57) ABSTRACT

A multifunctional conveyance type conveyor chain is disclosed in which ball units and conveyance auxiliary units can be separately and easily attached and detached to a chain link. A multifunctional conveyance type conveyor chain (100) includes a number of chain links (110) which are each integrally molded of an article loading portion (111) on which an article is loaded and a plurality of hinge portions (112). The chain links (110) are connected to each other in a longitudinal direction of the chain through hinge pins (120). A ball unit (130) holds a free ball (131) which rolls in an exposed manner on both a surface and a back surface of the chain link (110). Conveyance auxiliary units 140 mountable in place of ball units (130) are respectively selectively inserted and mounted between every hinge portions (112, 112).

17 Claims, 9 Drawing Sheets

MULTIFUNCTIONAL CONVEYANCE TYPE CONVEYOR CHAIN

This application claims priority to Japanese Patent Application No. 2004-374030 filed Dec. 24, 2004.

TECHNICAL FIELD

The present invention relates to a conveyor chain suitable for loading and conveying a box-shaped, a plate-shaped or the like article having a flat bottom surface, and more specifically it relates to a multifunctional conveyance type conveyor including a ball unit holding a free ball, which rolls in an exposed manner on both a surface and a back surface of the chain link, and a conveyance auxiliary unit mountable in place of the ball unit.

BACKGROUND ART

As a conveyor chain, which loads and conveys articles, there is a conveyor belt in which rotatable balls or rollers are provided on a plurality of belt modules and the articles are processed to be assorted during conveyance so that they are unloaded while being slid at a side of the conveyance line (see Patent Reference 1).

And such a conveyor belt comprises a first member and a second member formed by vertically laminated belt modules on which articles are loaded to be conveyed, and hinge portions respectively formed in the first and second members are connected to each other with hinge pins. And between these first member and second member are rotatably held balls for slide-discharging articles to a side of the conveying line.

Patent Reference 1 is Japanese Laid-Open Patent Publication No. 2003-182829.

PROBLEMS TO BE SOLVED BY THE INVENTION

However, since the above-mentioned conveyor belt, which is a conventional conveyor chain uses a structure of a belt module in which vertically laminated first member and second member sandwiches a ball, there were problems that not only a parts count forming a module, which is an indispensable part of a belt, is increased to two times, but also an integrated strength of the belt module cannot be exhibited.

Further, when a worn-out ball is replaced, it is necessary to vertically decompose a belt module comprising a hinge pin which is pulled out of the first member and second member, so as to remove the worn-out ball. Thus there is a problem that in this replacement balls other than the worn-out ball are disengaged whereby the replacement operation becomes troublesome.

Further, in such a conveyor belt, articles are processed to be assorted during conveyance so that they can be unloaded while being slid at a side of the conveyance line by providing balls. However, since a loading position of the articles is excessively displaced in a belt width direction during conveyance and the articles are conveyed like a snake or in a state where one side of the belt is raised due to the displacement, there were problems that the conveyor belt cannot attain a reliable conveyance or respond to the variety of conveyance needs.

Accordingly, the object of the present invention is to solve the above-mentioned prior art problems or to provide a multifunctional conveyance type conveyor chain in which ball units and conveyance auxiliary units can be separately, easily attached and detached to a chain link and a conveyance function in accordance with the conveyance needs can be easily added.

MEANS FOR SOLVING THE PROBLEMS

A multifunctional conveyance type conveyor chain according to claim 1 solves the above-mentioned problems by a conveyor chain in which a number of chain links each being integrally molded of an article loading portion on which an article is loaded, and a plurality of hinge portions protruding from front edges and rear edges of said article loading portion in a staggered arrangement, are connected to each other in a longitudinal direction of the chain through hinge pins, characterized in that a ball unit holding a free ball, which rolls in an exposed manner on both a surface and a back surface of said chain link, and a conveyance auxiliary unit mountable in place of said ball unit are respectively selectively inserted and mounted between every hinge portions of any one of a front edge and a rear edge of the article loading portion during the connection of said chain links from the longitudinal direction of the chain.

A multifunctional conveyance type conveyor chain according to claim 2 solves said problems by the fact that, in addition to the configuration of claim 1, said ball unit and said conveyance auxiliary unit include the same mount engagement portion where they are inserted and mounted between said hinge portions to engage.

A multifunctional conveyance type conveyor chain according to claim 3 solves said problems by the fact that, in addition to the configuration of claim 2, said conveyance auxiliary unit includes a side restricting member, which restricts the movement of an article to be conveyed in a chain width direction.

A multifunctional conveyance type conveyor chain according to claim 4 solves said problems by the fact that, in addition to the configuration of claim 2 or claim 3, said conveyance auxiliary unit includes a scraper member, which unloads the article to be conveyed.

A multifunctional conveyance type conveyor chain according to claim 5 solves said problems by the fact that, in addition to the configuration of any one of claims 2 to 4, said conveyance auxiliary unit includes a floating suppressing member for said chain link.

A multifunctional conveyance type conveyor chain according to claim 6 solves said problems by the fact that, in addition to the configuration of any one of claims 2 to 5, characterized in that said conveyance auxiliary unit includes a snaking prevention member for said chain link.

EFFECTS OF THE INVENTION

Since, in the multifunctional conveyance type conveyor chain according to the present invention, a number of chain links each being integrally molded of an article loading portion on which an article is loaded, and a plurality of hinge portions protruding from front edges and rear edges of said article loading portion in a staggered arrangement, are connected to each other in a longitudinal direction of the chain through hinge pins, the multifunctional conveyance type conveyor chain can load and convey a box-shaped, a plate-shaped or the like article or articles each having a flat bottom surface and can exhibit the following peculiar effects by including the following configurations.

That is, according to the multifunctional conveyance type conveyor chain of claim 1, since a ball unit holding a free ball is mounted and the free ball rolls in an exposed manner on a surface and a back surface of the chain link, the multifunctional conveyance type conveyor chain can exhibit a function by which articles can be conveyed at maximum two times the chain speed, that is a double speed function, and a conveyance direction conversion function, by which articles can be conveyed in an entire horizontal plane over 360 degrees. Further, since a ball unit and a conveyance auxiliary unit which can be replaced by the ball unit are mounted, conveyance functions in accordance with various conveyance needs can be added in combination with these double speed function and conveyance direction conversion function.

And since the ball unit and the conveyance auxiliary unit are formed so that they are respectively, selectively inserted and mounted on between every hinge portions, the ball unit and the conveyance auxiliary unit can be easily mounted between hinge pin portions from a longitudinal direction of the chain even in a single part without separating chain link. And since this ball unit and conveyance auxiliary unit-mounted chain links are connected to each other with a hinge pin, a chain assembly operation can be easily attained without inadvertent detachment of the ball unit and the conveyance auxiliary unit during the connection of the chain links. Further, even in a case where for example a worn out ball unit or conveyance auxiliary unit is replaced, a replacement operation can be selectively, easily attained without inadvertently disengaging a unit other than a worn out unit.

Since the ball unit and the conveyance auxiliary unit include the same mount engagement portion where they are inserted and mounted between said hinge portions to be engaged, in addition to the effect exhibited by the invention of claim 1, the multifunctional conveyance type conveyor chain according to claim 2 ensures compatibility between the ball unit and the conveyance auxiliary unit so that the ball unit and the conveyance auxiliary unit can be freely arranged on a conveyance surface. Thus a conveyance functional form in accordance with various conveyance needs can be produced.

Since said conveyance auxiliary unit includes a side restricting member, in addition to the effect exhibited by the invention of claim 2, the multifunctional conveyance type conveyor chain according to claim 3 can restrict an inadvertent movement of a article to be conveyed in the width direction of the chain and can prevent inadvertent slip toward a side of the conveyance line.

Since said conveyance auxiliary unit includes a scraper member, in addition to the effect exhibited by the invention of claim 2 or claim 3, the multifunctional conveyance type conveyor chain according to claim 4 can forcefully unload conveyed articles toward a transfer side at an unloading area of the conveying line.

Since said conveyance auxiliary unit includes a floating suppressing member, in addition to the effect exhibited by the invention of any one of claims 2 to 4, the multifunctional conveyance type conveyor chain according to claim 5 can suppress the floating of the chain link so that a stable conveyance of articles can be realized and at the same time partial wear, which is liable to occur between a chain link and a hinge pin can be avoided. Additionally, conveyance noise due to floating conveyance can be reduced.

Since said conveyance auxiliary unit includes a snaking prevention member, in addition to the effect exhibited by the invention of any one of claims 2 to 5, the multifunctional conveyance type conveyor chain according to claim 6 prevents the snaking of chain links so that a stable conveyance of articles can be realized and at the same time partial wear, which is liable to occur between a chain link and a hinge pin can be avoided. Additionally, conveyance noise due to floating conveyance can be reduced.

Figure 1:
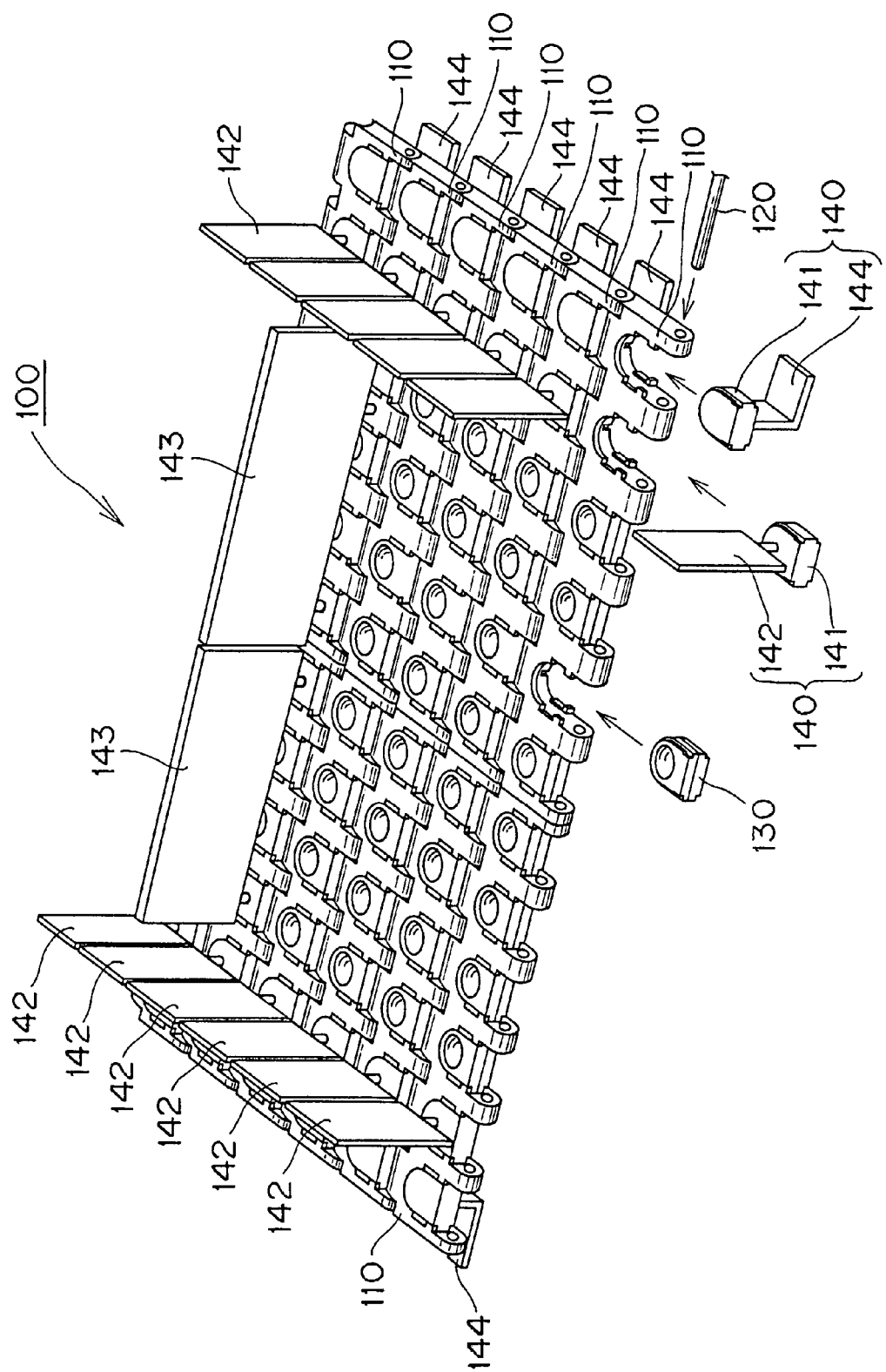
FIG. 1 is a schematic explanatory view of a multifunctional conveyance type conveyor chain, which is one example of the present invention.

A better understanding of the drawings will be had when reference is made to the Description of the Invention and Claims which follow hereinbelow.

DESCRIPTION OF THE INVENTION

In a multifunctional conveyance type conveyor chain of the present invention in which a number of chain links each being integrally molded of an article loading portion on which an article is loaded, and a plurality of hinge portions protruding from front edges and rear edges of said article loading portion in a staggered arrangement, are connected to each other in a longitudinal direction of the chain through hinge pins, a ball unit holding a free ball, which rolls in an exposed manner on both a surface and a back surface of said chain link, and a conveyance auxiliary unit mountable in place of said ball unit are respectively selectively inserted and mounted on between every hinge portions of any one of a front edge and a rear edge of the article loading portion during the connection of said chain links from the longitudinal direction of the chain. Thus, a ball unit and a conveyance auxiliary unit are separately and easily mounted on and removed from a chain link, which is a single member and a conveyance function in accordance with conveyance needs is easily added. Therefore any concrete embodiments may be used.

That is the chain link used in the multifunctional conveyance type conveyor chain of the present invention may use any link width in accordance with the line width of a conveyance line. Further, if a ball unit and a conveyance auxiliary unit can be selectively inserted and mounted between hinge portions, any number of hinge portions integrally molded with the chain link may be used. Further, a size of a loadable portion formed on an article loading portion and a size of a protruding portion of a hinge portion and the like can adopt sizes appropriately defined in accordance with a chain pitch of the chain link and the like.

And since a concrete mount form for causing the ball unit and the conveyance auxiliary unit to selectively insert and mount between hinge portions is adapted so that the ball unit and the conveyance auxiliary unit are freely arranged on a conveyance plane so as to produce a conveyance functional form in accordance with various conveyance needs, a U-shaped, a horseshoe-shaped mount space portion is formed between hinge portions. Thus the multifunctional conveyance type conveyor chain may be used if it includes the same mounting engagement portions where the ball units and the conveyance auxiliary units are inserted into and mounted on mount space portions between hinge portions. That is if the multifunctional conveyance type conveyor chain includes mounting engagement portions which can ensure compatibility between the ball unit and the conveyance auxiliary unit, any form of the mounting engagement portion may be used.

If a concrete form of the ball unit is one, in which the ball unit holds a free ball, which rolls in an exposed manner on both a surface and a back surface of the chain link and can exhibit a double speed function by which conveyance is possible at maximum two times the chain speed, any unit form may be adopted. The ball unit is preferably formed so that a free ball is rotated in an exposed manner on both a surface and a back surface of the chain link with the free ball sandwiched and held between the upper retainer and the lower retainer.

Further, if a concrete form of the conveyance auxiliary unit is one, in which the conveyance auxiliary unit includes the same mounting engagement portion, and it is separately and easily mounted on and removed from a chain link of a single member and a conveyance function in accordance with conveyance needs is easily added, any concrete form may be used. For example, a side restricting member, which blocks inadvertent movement of an article to be conveyed in a chain width direction and slip of the article, a scraper member, which forcefully unloads conveyed articles toward a transfer side at an unloading area of the conveying line, a floating suppressing member, which suppresses the floating of the chain link to realize a stable conveyance of articles and a snaking prevention member, which prevents the snaking of the chain link to realize a stable conveyance of articles and the like are preferred.

EXAMPLE

A multifunctional conveyance type conveyor chain, which is one example of the present invention, will be described with reference to FIGS. 1 to 9.

Figure 2:
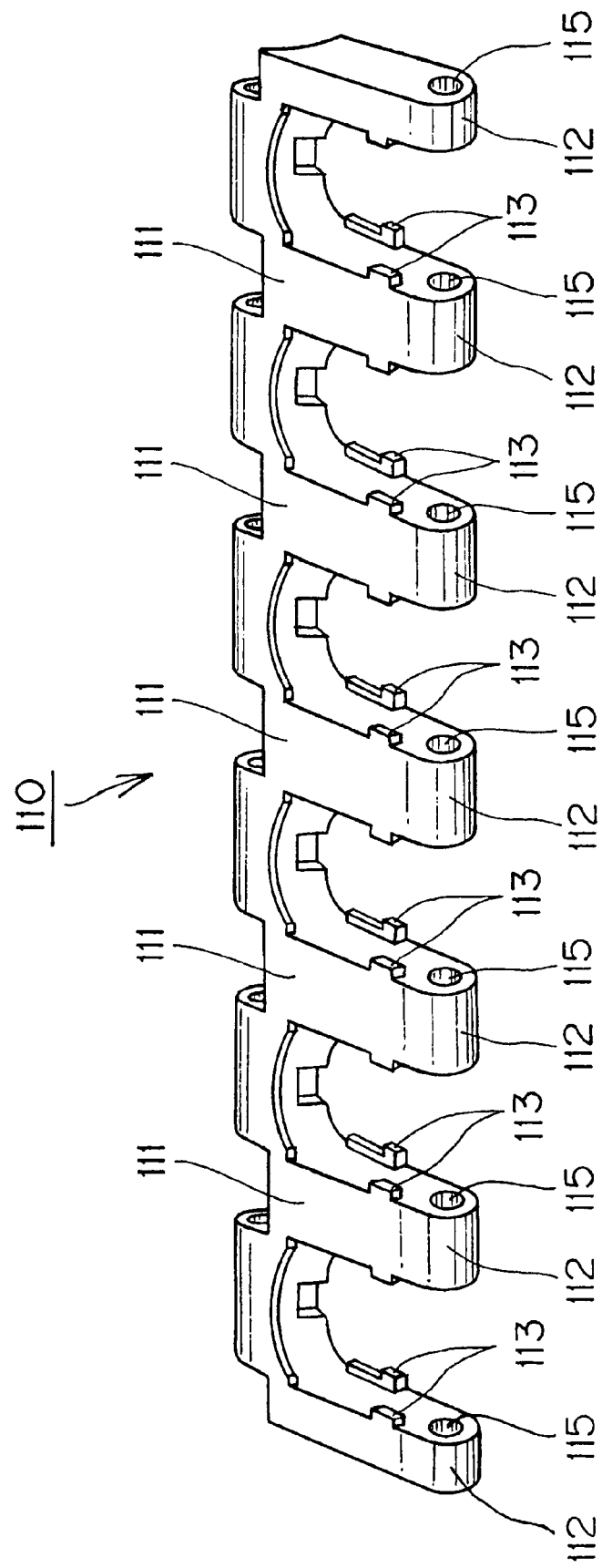
FIG. 2 is a perspective view viewed from the surface side of the chain link shown in FIG. 1.
Figure 3:
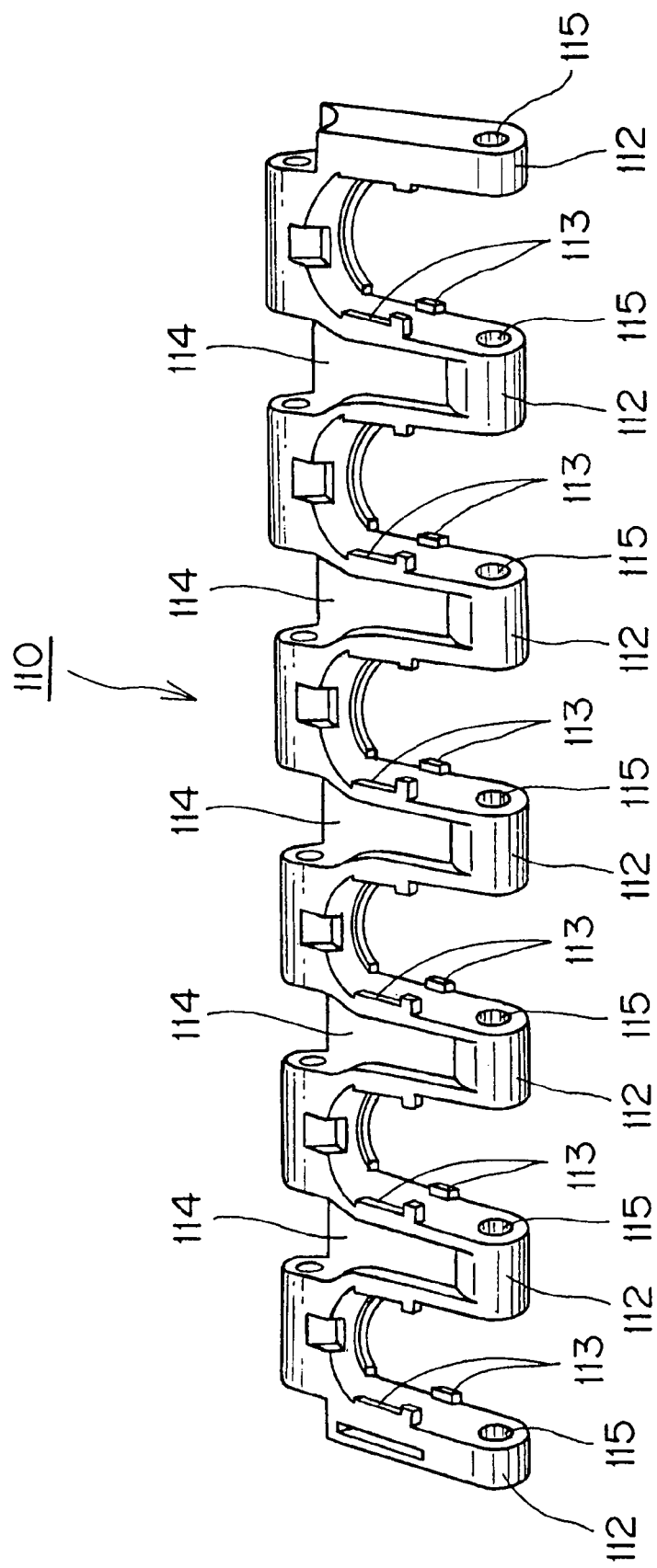
FIG. 3 is a perspective view viewed from the back surface side of the chain link shown in FIG. 1.
Figure 4:
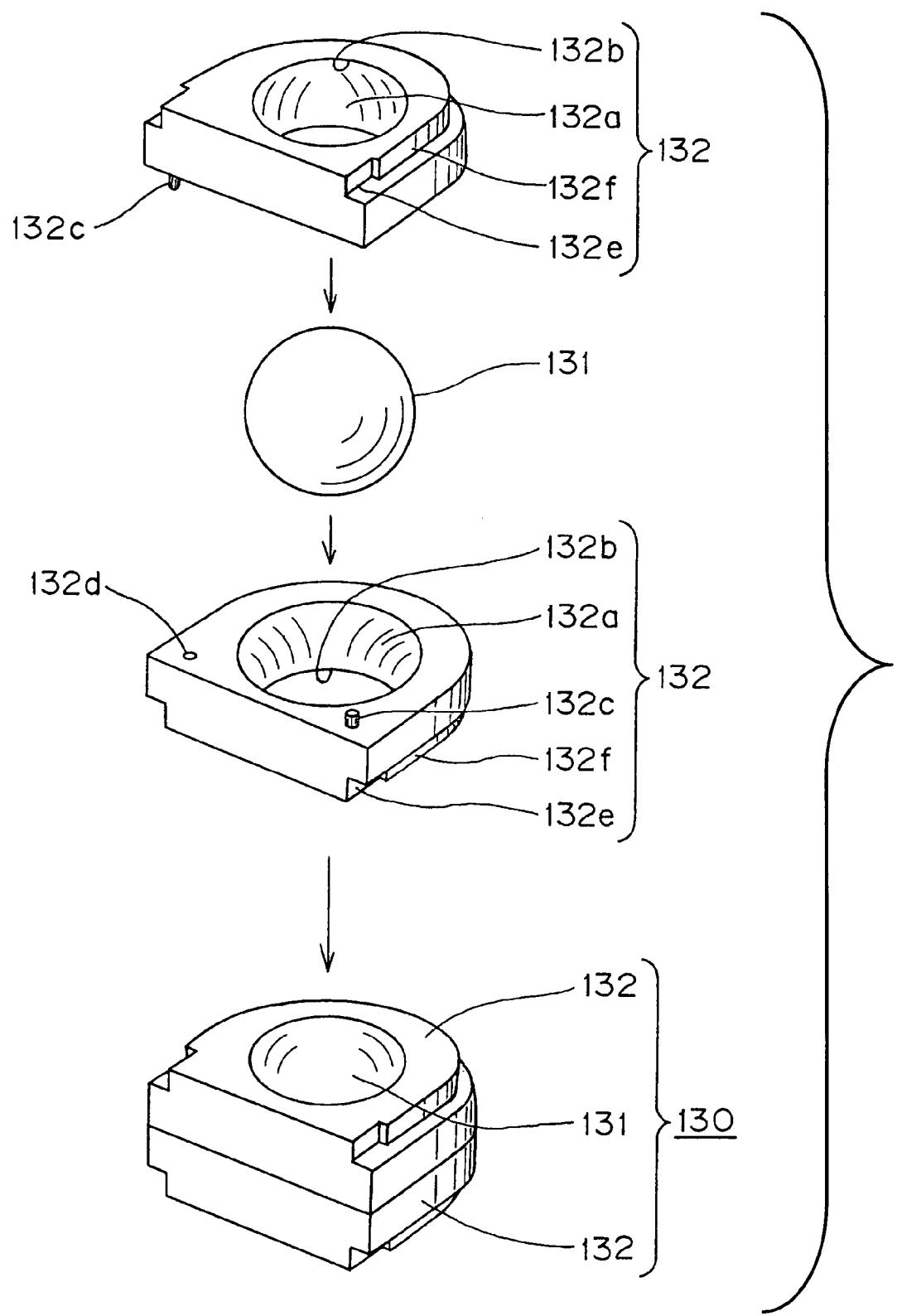
FIG. 4 is an explosion assembly view of a ball unit.
Figure 5:
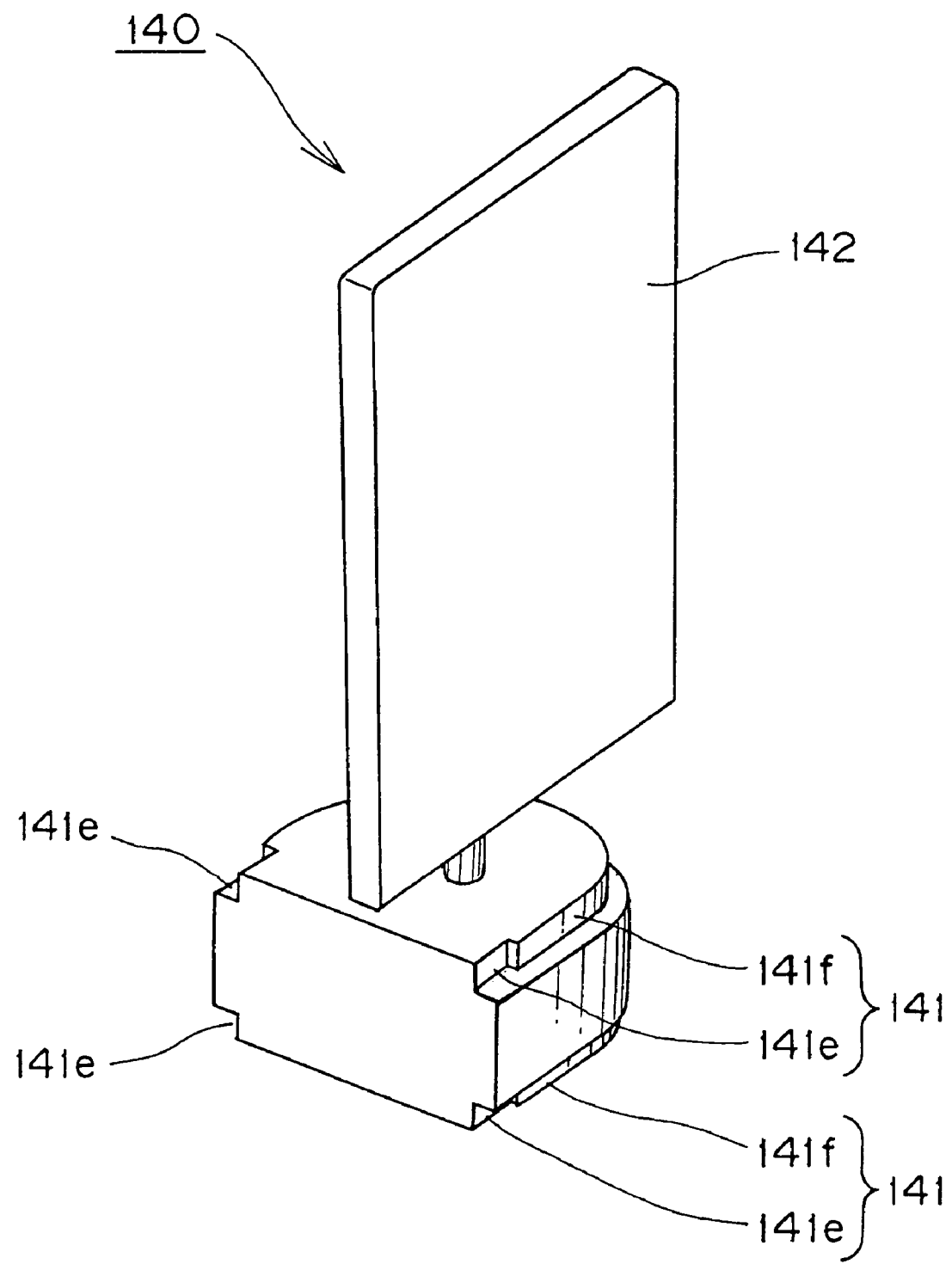
FIG. 5 is a perspective view of a conveyance auxiliary unit including a side suppressing member
Figure 6:
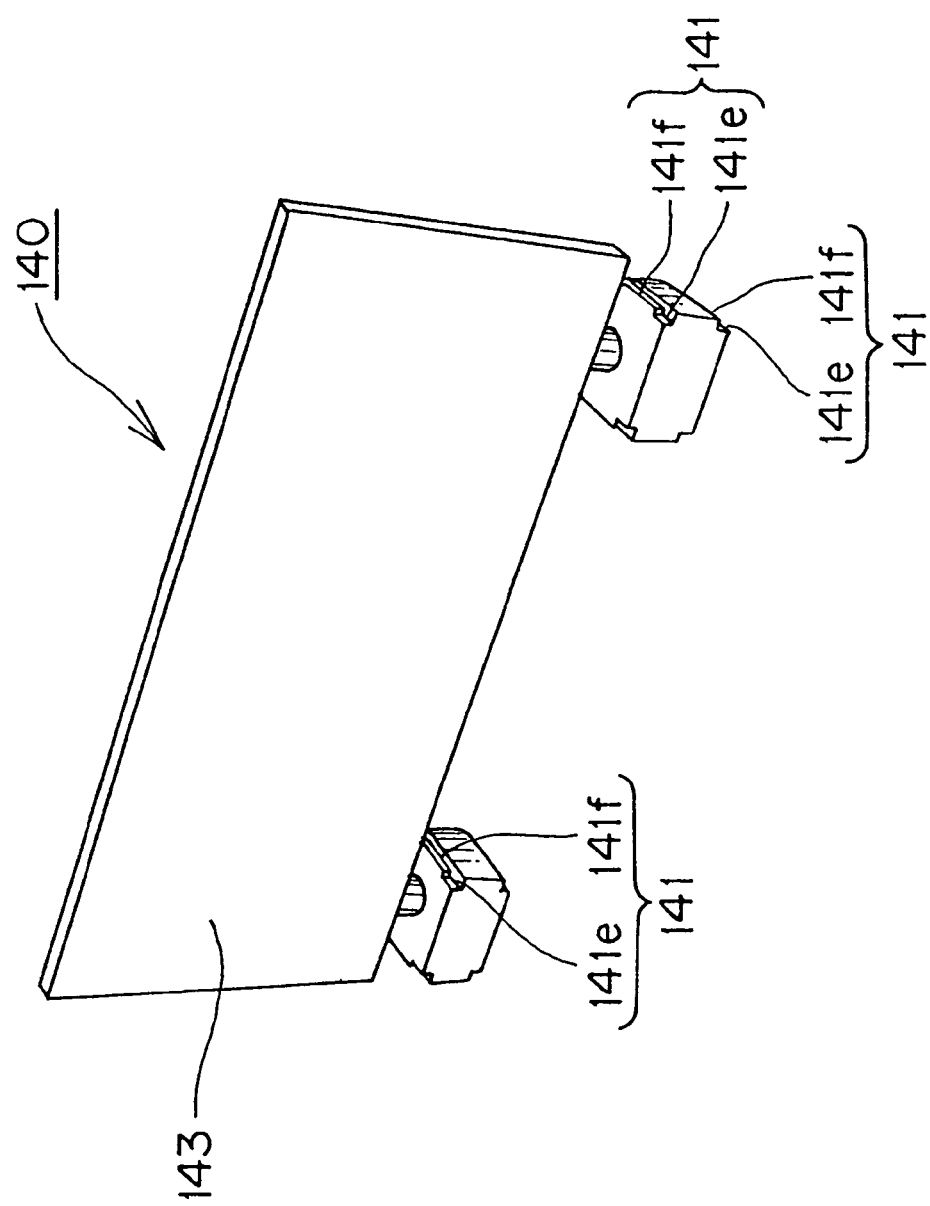
FIG. 6 is a perspective view of a conveyance auxiliary unit including a scraper member.
Figure 7:
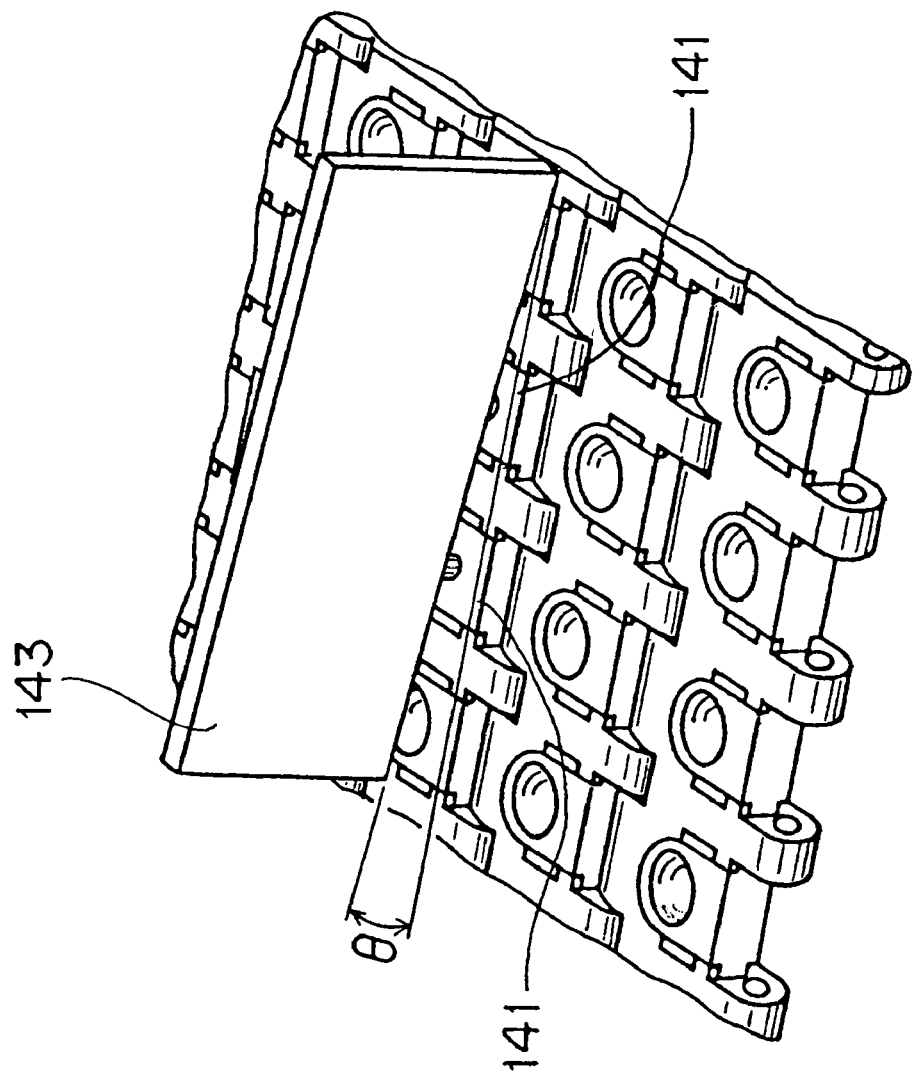
FIG. 7 is a schematic explanatory view of a multifunctional conveyance type conveyor chain including a scraper member at an angle.
Figure 8:
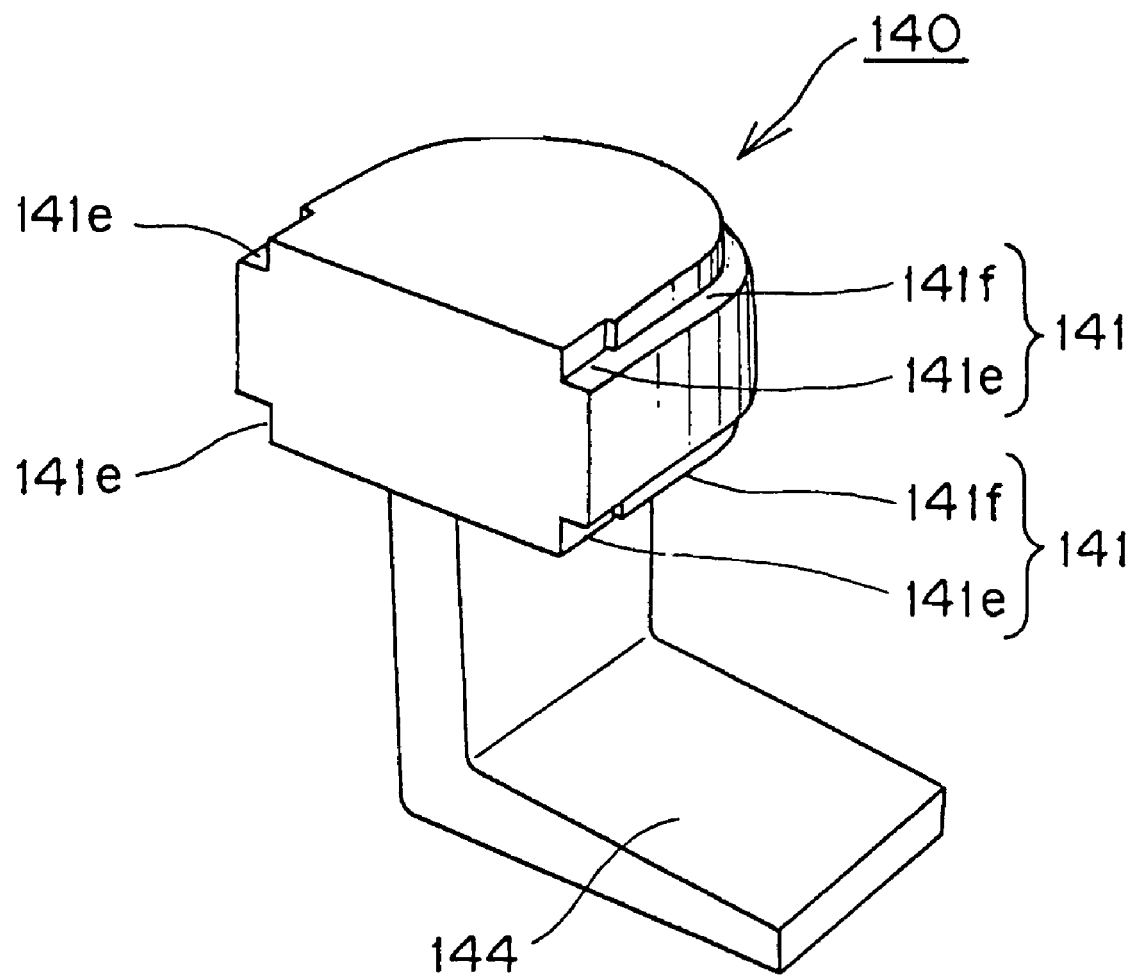
FIG. 8 is a perspective view of a conveyance auxiliary unit including a floating prevention member.
Figure 9:
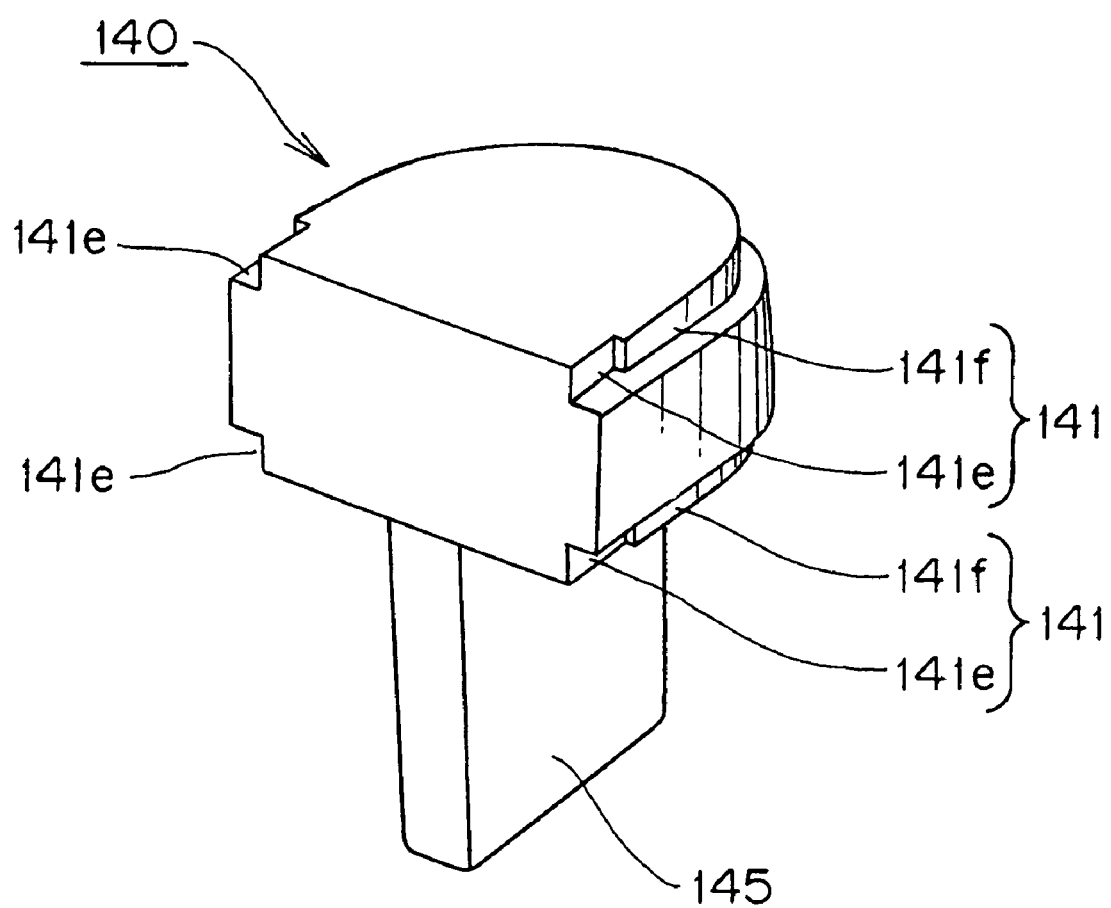
FIG. 9 is a perspective view of a conveyance auxiliary unit including a snaking prevention member.

FIG. 1 is a schematic explanatory view of a multifunctional conveyance type conveyor chain, which is one example of the present invention, FIG. 2 is a perspective view viewed from the surface side of the chain link shown in FIG. 1, FIG. 3 is a perspective view viewed from the back surface side of the chain link shown in FIG. 1, FIG. 4 is an explosion assembly view of a ball unit, FIG. 5 is a perspective view of a conveyance auxiliary unit including a side suppressing member, FIG. 6 is a perspective view of a conveyance auxiliary unit including a scraper member, FIG. 7 is a schematic explanatory view of a multifunctional conveyance type conveyor chain including a scraper member at an angle, FIG. 8 is a perspective view of a conveyance auxiliary unit including a floating prevention member and FIG. 9 is a perspective view of a conveyance auxiliary unit including a snaking prevention member.

A multifunctional conveyance type conveyor chain 100 of the present example is formed as shown in FIG. 1 in such a manner that a number of chain links 110 are connected to each other in the longitudinal direction of the chain through a hinge pin 120, and a ball unit 130, which exhibits a double speed function by which articles can be conveyed at maximum two times the chain speed and a conveyance direction conversion function by which the articles can be conveyed in an entire horizontal plane over 360 degrees, and a conveyance auxiliary unit 140, which exhibits a conveyance function in combination with the direction conversion function and the double speed function are inserted into and mounted on the chain link 110 from the longitudinal direction of the chain and that box-shaped, plate-shaped or the like articles each having a flat bottom surface are loaded on the chain to be conveyed.

It should be noted that although the multifunctional conveyance type conveyor chain 100 shown in FIG. 1 includes all functions for convenience to explain a setting form of the conveyance auxiliary unit 140 as a concrete unit of the conveyance auxiliary unit 140 used in the present example, that is, a function by which 2, the multifunctional conveyance type conveyor chain according to claim 3 can restrict inadvertent movement and slip an article to be conveyed in the width direction of the chain are blocked, a function by which conveyed articles are forcefully unloaded toward a transfer side at a unloading area of the conveyance line, a function by which floating of the chain link 110 is suppressed so that a stable conveyance of articles is realized, and a function by which the snaking of chain links 110 is prevented so that a stable conveyance of articles is realized, a conveyance auxiliary conveyance unit 140 having a part of the functions may be provided in place of a ball unit 130 disposed at a predetermined position.

Further, although, in this example, chain links 110, 110 having the same link width are formed so that they are arranged in two lines in the chain width direction, the chain link may be formed in the chain width direction. Alternatively, the chain links may be formed in such a manner that chain links having different link widths are butted to each other in the chain width direction so that they are connected to each other as bricklaying in the chain width direction and the butted surfaces are not aligned in the longitudinal direction of the chain.

Here, as shown in FIGS. 2 and 3, the chain link 110 is integrally molded by an article loading portion 111, which loads articles, a plurality of hinge portions 112 protruding from front edges and rear edges of the article loading portion 111 in a staggered manner, upper and lower pair of locking protruding portions 113, 113, which lock ball units 130 (FIG. 4) or conveyance auxiliary units 140 (FIG. 5), which are respectively, selectively inserted and mounted between every hinge portions 112, 112 from the longitudinal direction of the chain during connecting chain links 110, and engagement portions 114, which engage an usual driving sprocket or the like not shown to transmit conveyance power, with a synthetic resin called as an engineering plastic.

It is noted that the reference numeral 115 in FIGS. 2 and 3 denotes a pin hole for inserting a hinge pin 120.

The above-mentioned ball unit 130 exhibits the article conveyance direction conversion function and double speed function as described above, and comprises a free ball 131 and upper and lower pair of retainers 132, 132, which sandwich and hold the free ball 131, as shown in FIG. 4.

And the upper and lower pair of retainers 132, 132, respectively includes a hemispherical ball receiving seat 132a, which holds the rotatable free ball 131 and an opening portion 132b, which causes the free ball 131 to expose on a surface and a back surface of the chain link 110 to rotate it.

It is noted that the reference numeral 132c in FIG. 4 denotes a positioning protrusion, which is used when upper and lower pair of U-shaped retainers 132, 132 are fitted to each other, and the reference numeral 132d in FIG. 4 denotes a blind hole into which the positioning protrusion 133c opposed at the fitting of the upper and lower pair of U-shaped retainers 132, 132 is inserted.

Further, in the upper and lower U-shaped retainers 132, 132 are formed mount engagement portions by cut out portions 132e, 132e and locking step portions 132f, 132f, which are locked to the upper and lower pair of locking protruding portions 113, 113 provided in the chain link 110 when the ball unit 130 or the conveyance auxiliary unit 140 are inserted and mounted between hinge portions 112, 112 of the chain link 110 from the longitudinal direction of the chain.

Next, the conveyance auxiliary unit 140 used in the multifunctional conveyance type conveyor chain 100 of the present invention will be described with reference to FIGS. 5 to 9.

The conveyance auxiliary units 140 used in the present example include a unit, which blocks inadvertent movement and slip of articles to be conveyed, a unit, which forcefully unloads articles conveyed in an unloading area of the conveyance line toward a loading side, a unit, which suppresses the floating of the chain link to realize a stable article conveyance, and a unit, which prevents the snaking of the chain link 110 to realize a stable article conveyance.

And since these conveyance auxiliary units 140 are inserted and mounted between hinge portions 112, 112 of the chain link 110 to be locked, they ensure compatibility with ball units 130 by including the mount engagement portions each having the same form as the upper and lower pair of U-shaped retainers 132, 132 of the above-mentioned ball unit 130 so that the conveyance auxiliary units 140 can be freely arranged. Thus, in these conveyance auxiliary units 140, a conveyance function form in accordance with various conveyance needs can be produced.

It is noted that the reference numerals 141e in FIGS. 5, 6, 8 and 9 denote cut out portions, which are locked to upper and lower pair of locking protruding portions 113, 113 provided in the chain link 110 when the ball unit 130 or the conveyance auxiliary unit 140 are inserted and mounted between hinge portions 112, 112 of the chain link 110 from the longitudinal direction of the chain, and the reference numeral 141f denotes a locking step portion locked at upper and lower pair of locking protruding portions 113, 113 provided in the chain link 110.

That is as shown in FIG. 5, a conveyance auxiliary unit 140 including mount engagement portions 141, which are inserted and mounted between hinge portions 112, 112 of the chain link 110 to be engaged and a plate-shaped side restricting member 142 oriented in the longitudinal direction of the chain is adapted to restrict inadvertent movement of articles to be conveyed in the chain width direction and to prevent inadvertent slip toward a side of the conveying line so that the side restricting member 142 guards articles to be conveyed from both sides of the chain in a holding state.

As shown in FIG. 6, a conveyance auxiliary unit 140 including right and left pair of spaced mount engagement portions 141, which are inserted and mounted between hinge portions 112, 112 of the chain link 110 to be engaged, and a scraping plate-shaped scraper member 143, is adapted so that the scraping plate-shaped scraper member 143 stops the backward movement of articles to be conveyed vertically, articles are forcefully unloaded in a lateral direction by providing the scraper member 143 with a degree (θ) with respect to the chain width direction as shown in FIG. 7 and conveyed articles can be forcefully unloaded toward a transfer side at a unloading area of the conveying line.

Further, as shown in FIG. 8, since in a conveyance auxiliary unit 140 including mount engagement portions 141, which are inserted and mounted between hinge portions 112, 112 of the chain link 110 to be engaged and an L-shaped floating suppressing member 144, the floating suppressing member 144 conveyance-travels while holding a part of a guide rail (not shown) provided below both sides of the conveyance line, floating of the chain link is suppressed so that stable article conveyance can be realized and vertical conveyance can be performed. Further, the conveyance auxiliary unit 140 can avoid partial wear, which is liable to occur between a chain link and a hinge pin, and can reduce conveyance noise due to the floating conveyance.

Furthermore, as shown in FIG. 9, since a conveyance auxiliary unit 140 including mount engagement portions 141, which are inserted and mounted between hinge portions 112, 112 of the chain link 110 to be engaged and a snaking prevention member 145, is adapted in such a manner that the snaking prevention member 145 travels while being held by a guide rail (not shown) having a U-shaped section provided below the conveyance line, snaking of the chain link 110 is prevented so that stable article conveyance can be realized. Further, a partial wear, which is liable to occur between a chain link 110 and a hinge pin 120 can be avoided conveyance noise due to the snaking conveyance can be reduced.

It is noted that since all of the chain links 110, the hinge pins 120, the ball units 130 and the conveyance auxiliary units 140 in the present example are molded of an engineering plastic, they are lightweight and easy to handle. Alternatively, they may be formed of general plastics or metal.

In the thus obtained multifunctional conveyance type conveyor chain 100 of the present example, since a ball unit 130 holding a free ball 131, which rolls in an exposed manner on both a surface and a back surface of the chain link 110, and a conveyance auxiliary unit 140 mountable in place of the ball unit 130 are respectively selectively inserted and mounted between every hinge portions 112, 112 of any one of a front edge and a rear edge of the article loading portion 111 during the connection of the chain links from the longitudinal direction of the chain, a chain assembly operation can be easily attained without inadvertent detachment of the ball unit 130 and the conveyance auxiliary unit 140 during the connection of the chain links. Further, even in a case where worn out ball unit 130 or conveyance auxiliary unit 140 is replaced, a selective easy replacement operation can be performed without inadvertent disengagement of units other than the worn out unit, and conveyance functions in accordance with various conveyance needs can be easily added in combination with a direction conversion function and a double speed function exhibited by the ball unit 130. Thus the effects of the invention are very large.

DESCRIPTION OF REFERENCE NUMERALS

100 . . . Conveyor chain
110 . . . Chain link
111 . . . Article loading portion
112 . . . Hinge portion
113 . . . Locking protruding portion
114 . . . Engagement portion
115 . . . Pin hole
120 . . . Hinge pin
130 . . . Ball unit
131 . . . Free ball
132 . . . Retainer
132a . . . Ball receiving seat
132b . . . Opening portion 132c . . . Positioning protrusion
132d . . . Blind hole
132e . . . Retainer side cut out portion
132f . . . Retainer side locking step portion
140 . . . Conveyance auxiliary unit
141 . . . Mount engagement portion
141e . . . Conveyance auxiliary side cut out portion
141f . . . Conveyance auxiliary side locking step portion
142 . . . Side restricting member
143 . . . Scraper member
144 . . . Floating suppressing member
145 . . . Snaking prevention member While the invention has been described herein by way of example those skilled in the art will readily recognize that changes and modifications may be made to the invention without departing from the spirit and scope of the appended claims.

The invention claimed is:

1. A multifunctional conveyance type conveyor chain comprising: a plurality of chain links each being integrally molded; each of said chain links includes an article loading portion on which an article is loaded; each of said chain links includes a plurality of hinge portions protruding from front edges and rear edges of said article loading portion in a staggered arrangement; each of said chain links are connected to each other in a longitudinal direction of the chain through hinge pins; a plurality of ball units each holding a free ball; each of said balls rolls in an exposed manner on both a surface and a back surface of said chain link; a plurality of conveyance auxiliary units mountable in place of respective ones of said plurality of ball units; and said plurality of conveyance auxiliary units being selectively inserted and mounted between respective ones of said plurality of said hinge portions during the connection of said chain links from the longitudinal direction of the chain.

2. A multifunctional conveyance type conveyor chain according to claim 1, wherein said plurality of ball units and said plurality of conveyance auxiliary units each include a mount engagement portion and said mount engagement portion of said plurality of ball units and said conveyance auxiliary units are identical.

3. A multifunctional conveyance type conveyor chain according to claim 2, characterized in that one of said conveyance auxiliary units includes a side restricting member, which restricts the movement of an article to be conveyed in a chain width direction.

4. A multifunctional conveyance type conveyor chain according to claim 2, characterized in that one of said conveyance auxiliary units includes a scraper member, which unloads the article to be conveyed.

5. A multifunctional conveyance type conveyor chain according to claim 3, characterized in that one of said conveyance auxiliary units includes a scraper member, which unloads the article to be conveyed.

6. A multifunctional conveyance type conveyor chain according to claim 2, characterized in that one of said conveyance auxiliary units includes a floating suppressing member for said chain link.

7. A multifunctional conveyance type conveyor chain according to claim 3, characterized in that one of said conveyance auxiliary units includes a floating suppressing member for said chain link.

8. A multifunctional conveyance type conveyor chain according to claim 4, characterized in that one of said conveyance auxiliary units includes a floating suppressing member for said chain link.

9. A multifunctional conveyance type conveyor chain according to claim 5, characterized in that one of said conveyance auxiliary units includes a floating suppressing member for said chain link.

10. A multifunctional conveyance type conveyor chain according to claim 2, characterized in that one of said conveyance auxiliary units includes a snaking prevention member for said chain link.

11. A multifunctional conveyance type conveyor chain according to claim 3, characterized in that one of said conveyance auxiliary units includes a snaking prevention member for said chain link.

12. A multifunctional conveyance type conveyor chain according to claim 4, characterized in that one of said conveyance auxiliary units includes a snaking prevention member for said chain link.

13. A multifunctional conveyance type conveyor chain according to claim 5, characterized in that one of said conveyance auxiliary units includes a snaking prevention member for said chain link.

14. A multifunctional conveyance type conveyor chain according to claim 6, characterized in that one of said conveyance auxiliary units includes a snaking prevention member for said chain link.

15. A multifunctional conveyance type conveyor chain according to claim 7, characterized in that one of said conveyance auxiliary units includes a snaking prevention member for said chain link.

16. A multifunctional conveyance type conveyor chain according to claim 8, characterized in that one of said conveyance auxiliary units includes a snaking prevention member for said chain link.

17. A multifunctional conveyance type conveyor chain according to claim 9, characterized in that one of said conveyance auxiliary units includes a snaking prevention member for said chain link.

* * * * *